United States Patent
Ashizawa

(10) Patent No.: US 9,609,178 B2
(45) Date of Patent: Mar. 28, 2017

(54) COLOR IMAGE PROCESSING DEVICE

(71) Applicants: TOPPAN PRINTING CO., LTD., Tokyo (JP); NISCA CORPORATION, Minamikoma-gun, Yamanashi (JP)

(72) Inventor: Katsuhisa Ashizawa, Yamanashi (JP)

(73) Assignees: TOPPAN PRINTING CO., LTD., Tokyo (JP); NISCA CORPORATION, Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 14/782,488

(22) PCT Filed: Apr. 4, 2014

(86) PCT No.: PCT/JP2014/059953
§ 371 (c)(1),
(2) Date: Oct. 5, 2015

(87) PCT Pub. No.: WO2014/163182
PCT Pub. Date: Oct. 9, 2014

(65) Prior Publication Data
US 2016/0057315 A1  Feb. 25, 2016

(30) Foreign Application Priority Data
Apr. 5, 2013  (JP) ................................. 2013-079528

(51) Int. Cl.
*H04N 1/46* (2006.01)
*H04N 1/60* (2006.01)
*H04N 1/405* (2006.01)

(52) U.S. Cl.
CPC ......... *H04N 1/6069* (2013.01); *H04N 1/4055* (2013.01); *H04N 1/6016* (2013.01); *H04N 2201/0082* (2013.01)

(58) Field of Classification Search
None
See application file for complete search history.

(56) References Cited

U.S. PATENT DOCUMENTS 4,884,080 A * 11/1989 Hirahara ............ H04N 1/40087
346/46
6,108,105 A * 8/2000 Takeuchi ............. H04N 1/3871
358/1.2
(Continued)

FOREIGN PATENT DOCUMENTS

JP  2003-283816 A  10/2003
JP  2011-120027 A  6/2011
JP  2012-165192 A  8/2012

OTHER PUBLICATIONS

PCT, "International Search Report for International Application No. PCT/JP2014/059953".

*Primary Examiner* — Madelein Nguyen
(74) *Attorney, Agent, or Firm* — Manabu Kanesaka

(57) ABSTRACT

A color image processing device uses a dither pattern of blocks, each including a plurality of dots representing the gradations of each pixel of an image in a prescribed print region. The dots including one block are arranged in a growth sequence in the ascending order of gradation, and print data is written sequentially at the dots the number of which corresponds to the gradation associated with the block. An extracting unit extracts a data region holding the color components from the print data. A dither processing unit generates dither patterns for the color components extracted by the extracting unit. The dither processing unit detects whether one or more of the dots including each of the pixels forming the image are outside the data region, and moves any dot outside the data region to a certain dot including the same pixel and existing in the data region.

6 Claims, 6 Drawing Sheets

(56) References Cited

U.S. PATENT DOCUMENTS

| | | | |
|---|---|---|---|
| 6,731,400 B1* | 5/2004 | Nakamura | G06K 15/00 358/1.9 |
| 6,906,825 B1* | 6/2005 | Nakahara | H04N 1/4051 358/1.9 |
| 7,542,169 B2* | 6/2009 | Oki | H04N 1/405 358/2.1 |
| 7,656,558 B2* | 2/2010 | Kakutani | H04N 1/40087 358/1.1 |
| 8,654,419 B2* | 2/2014 | Miyazaki | H04N 1/407 347/103 |
| 2002/0031276 A1* | 3/2002 | Yagishita | G06T 9/004 382/252 |
| 2004/0027617 A1* | 2/2004 | Ishihara | G06K 15/00 358/3.13 |
| 2005/0219569 A1* | 10/2005 | Yamamoto | H04N 1/6097 358/1.9 |
| 2006/0193009 A1* | 8/2006 | Kakutani | H04N 1/4057 358/3.03 |
| 2007/0109604 A1 | 5/2007 | Marumoto | |
| 2008/0043257 A1* | 2/2008 | Yamazaki | H04N 1/40087 358/1.8 |
| 2008/0079960 A1 | 4/2008 | Yamazaki | |
| 2009/0091796 A1* | 4/2009 | Hirota | H04N 1/52 358/3.13 |
| 2009/0310150 A1* | 12/2009 | Marumoto | G06K 15/107 358/1.8 |
| 2010/0103435 A1* | 4/2010 | Namikata | G06T 3/0006 358/1.2 |
| 2010/0103468 A1* | 4/2010 | Namikata | H04N 1/4055 358/3.23 |
| 2012/0147424 A1* | 6/2012 | Doi | H04N 1/4092 358/1.15 |
| 2012/0155939 A1* | 6/2012 | Fukatsu | G03G 15/6585 399/341 |
| 2012/0229549 A1* | 9/2012 | Shibata | B41J 2/04508 347/15 |

* cited by examiner

COLOR IMAGE PROCESSING DEVICE

RELATED APPLICATIONS

The present application is National Phase of International Application No. PCT/JP 2014/059953filed Apr. 4, 2014, and claims priority from Japanese Application No. 2013-079528, filed Apr. 5, 2013, the disclosure of which is hereby incorporated by reference herein in its entirety.

TECHNICAL FIELD

The present invention relates to a color image processing device for use in printing apparatuses such as the thermal transfer printer, more particularly to a color image processing device for forming color images, each having a dither pattern in which blocks, each composed of a plurality of dots that represent the gradation of one pixel of the image.

BACKGROUND ART

An image processing device is known, which performs multi-gradation recording by using a dither pattern in which each pixel of the image to print is composed of a block constituted by a plurality of dots.

In the dither process of converting image data to read-in print data, different dither patterns for cyan, magenta color and yellow color components, respectively, are utilized in the entire input image data. Inevitably, jaggy (zigzag) parts may be generated near any edge of the print image.

A method is known, which can prevent degradation of the image quality which may result from the jaggy parts. In this method, the gravity center of the gradation value input for each dither pattern is calculated, and the dither pattern is switched to another for that gravity center. (Refer to Patent Document 1)

Also known is a method of extracting the edge information and then switching the process on the pixel of interest in accordance with the edge information. (Refer to Patent Document 2)

PRIOR-ART DOCUMENTS

Patent Documents

Patent Document 1: JP 2012-165192A
Patent Document 2: JP 2011-120027A

SUMMARY OF THE INVENTION

Technical Problem to be Solved by the Invention

In these prior-art techniques, however, many process steps and a complicated control process must be performed. This is because the gravity center of each pixel must be calculated and the edge information must be extracted to determine whether or not the jaggy process should be performed in accordance with whether any image-forming pixels exist at the edge part of the image. Further, the memory capacity will be very large to use the information acquired through the processes in order to determine whether the dither pattern should be switched or not.

Accordingly, an object of the present invention is to provide a color image processing device that can perform, in a short time, the process of reducing jaggy parts and requires but a small memory capacity to perform calculation process.

Means for Solving the Problem

To achieve the object mentioned above, a color image processing device according to this invention uses a dither pattern of blocks each composed of a plurality of dots representing the gradations each pixel of an image in a prescribed print region has. The dots constituting each block are arranged in a growth sequence in the ascending order of gradation. The print data of the image is written sequentially at the dots the number of which corresponds to the gradation of the pixels associated with the block. An extracting unit is provided to extract a data region holding the color components, from the print data of the image. A dither processing unit is provided to generate dither patterns for the color components extracted by the extracting unit. The dither processing unit detects whether one or more of the dots constituting each of the pixels constituting the image are outside the data region, and moves any dot outside the data region to a certain dot constituting the same pixel and existing in the data region.

At this point, the dither processing unit may sequentially move, in the block having one or more dots outside the data region, print data written in the dots which exist outside the data region, hold the print data and have higher arrangement order, to the dots which exist in the data region, hold no print data and have higher arrangement order.

In the dither pattern, the number of dots is a multiple of 3, preferably 9. If the number of dots is 9, the dots may be divided, in the growth sequence, into three rows, and the first grown dot of each row may be set off from the first grown dot of the immediately upper or lower row, thereby forming a step pattern.

The aforementioned dither pattern may be used to print cyan and magenta when a color image is processed by using at least cyan, magenta and yellow inks.

Advantages of the Invention

In this invention, it is detected whether one or more of the dots constituting each of the pixels constituting the image are outside the data region, any dot detected outside the data region is moved to a certain dot constituting the same pixel and existing in the data region. This simple process suffices to reduce the number of jaggy parts at the edges of the image. Hence, the invention can provide a color image processing device which can reduce the number of jaggy parts in a short time and which requires but a small memory capacity for the calculation process.

MODE FOR CARRYING OUT THE INVENTION

A color image processing device according to this invention will be described in detail, as an appropriate embodiment of the invention. The color image processing device according to this embodiment is a thermal transfer printer that uses three colors, i.e., cyan (C), magenta (M) and yellow (Y), to form color images.

Figure 1:
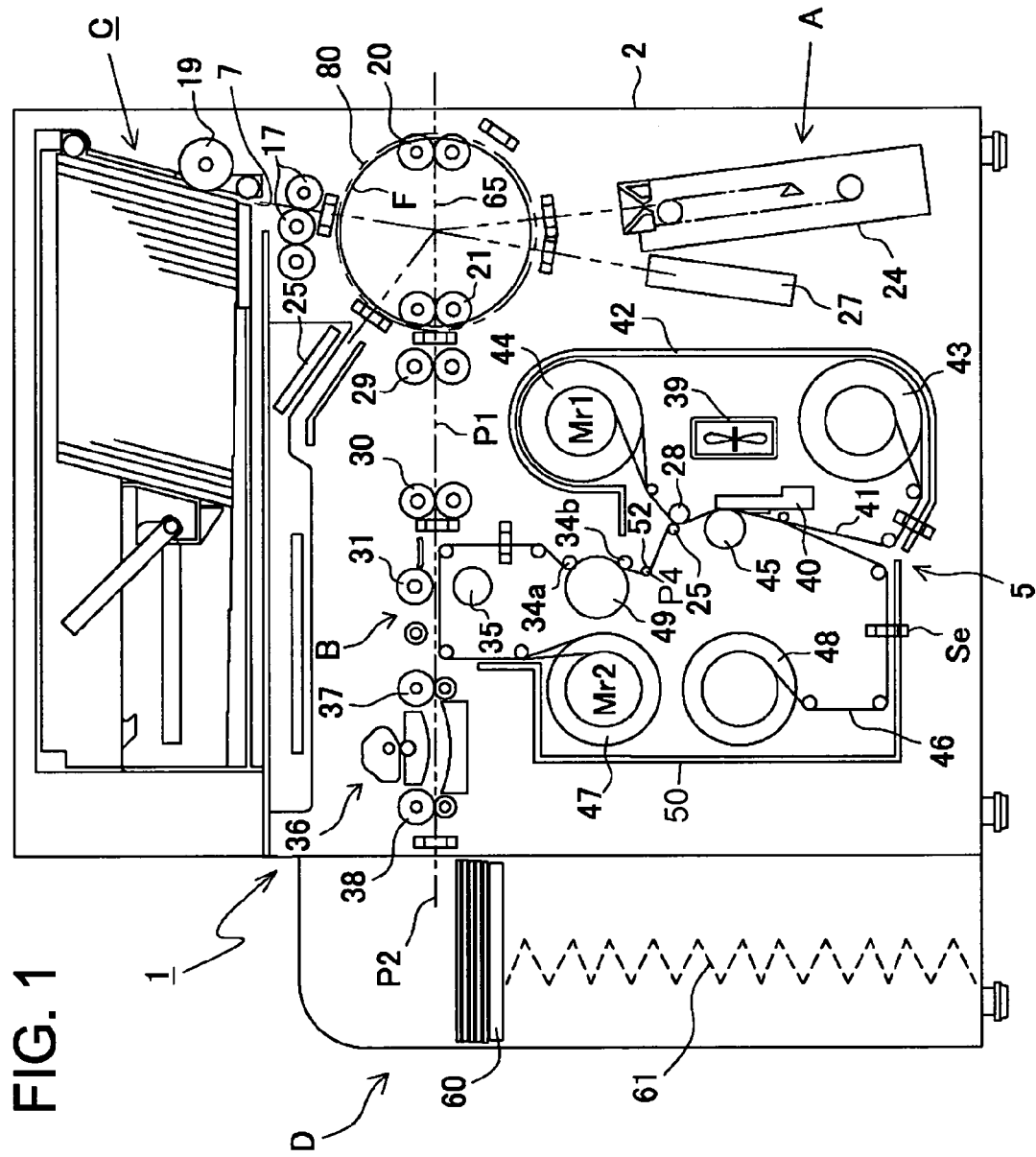
FIG. 1 is a sectional side view showing a schematic configuration of a card issuing apparatus that comprises a thermal transfer printer using a color image forming device according to this invention.

FIG. 1 is a sectional side view showing a schematic configuration of a card issuing apparatus 1 comprising a thermal transfer printer 5. The card issuing apparatus 1 is configured to record information on cards such as ID cards for use to identify persons and credit cards for use in commercial transaction. The housing 2 of the apparatus 1 incorporates an information recording unit A, an image forming unit B, a medium storing unit C, and a storage unit D.

The information recording unit A is composed of a magnetic recording unit 24, a non-contact IC recording unit 25, and a contact recording unit 27.

The medium storing unit C stores a plurality of cards aligned in standing position. The unit C has a feeding port 7 in its distal end. A pickup roller 19 may feed the cards from the unit C, the most front card at first.

Any card fed is first transported by feed rollers 17 to a reversing unit F. The reversing unit F is composed of a rotary frame 80 supported by bearings to rotate in the housing 2, and two pairs of rollers 20 and 21 supported by the frame 80. The rollers 20 are supported by the frame 80 and can rotate around their axes.

Around the reversing unit F, the magnetic recording unit 24, the non-contact IC recording unit 25, and the contact recording unit 27 are arranged. The pair of rollers 20 define a medium transport path 65 through which to transport each card to the recording unit 24, 25 or 27 in accordance with the type of the card. These recording units magnetically or electrically write data on the card.

The image forming unit B is configured to form an image such as a portrait or character data on the card. In the image forming unit B, a medium transport path P1 is provided to transport cards, extending from the medium transport path 65. At the medium transport path P1, transport rollers 29 and 30 are arranged to transport cards, and connected to a transport motor (not shown).

The image forming unit B comprises a film-shaped medium transporting device, and further comprises a primary transfer unit and a secondary transfer unit. In the primary transfer unit, the thermal head 40 prints an image on a transfer film 46 transported by the medium transporting device. Then, in the secondary transfer unit, the image is transferred from the transfer film 46 to the surface of the card existing in the medium transport path P1 and is printed by means of a heat roller 35. In the secondary transfer unit, the image is transferred as the heat roller 35 and a platen roller 31 clamp the transfer film 46 together with the card. The thermal head 40 has a plurality of heating elements arranged in the main scanning direction, and may print data as the transfer film 46, or printing medium, moves in the sub-scanning direction with respect to the thermal head 40.

At the downstream the image forming unit B, a medium transport path P2 is provided to transport the printed card to a storage stacker 60. At the medium transport path P2, transport rollers 37 and 38 are arranged to transport the card.

Between the transport roller 37 and a transport roller 38, a de-curling mechanism 36 is arranged, which is configured to push the middle part of the card held between the transport rollers 37 and 38, straightening up the card curled as the heat roller 35 performed the thermal transfer.

The storage unit D is configured to store the cards sent by a lift mechanism 61 from the image forming unit B. The cards move down (FIG. 1) and are stored.

The image forming unit B described above constitutes a thermal transfer printer 5 in which the primary transfer unit, by way of the color image processing device according to this invention, prints a color image on the transfer film 46. The thermal transfer printer 5 will be described in further detail.

The transfer film 46 is wound around the feed spool 47 and take-up spool 48 of a film cassette 50. Between the feed spool 47 and take-up spool 48 of the film cassette 50, the aforementioned film transport path P4 is provided. The feed spool 47 and the take-up spool 48 are coupled to a feed motor Mr2 and a take-up motor, respectively. Both motors are secured to the device frame and coupled to the spool shafts, constituted by a stepping motor each, and are configured to rotate in the same direction by the same angle.

In the film transport path P4, a transport roller 49 and pinch rollers 34a and 34b are arranged. The transfer film 46 is transported on the film transport path P4 as the transport roller 49 is driven and the pinch rollers 34a and 34b contact it with pressure. The transport roller 49 and the pinch rollers 34a and 34b therefore constitute a means for transporting the transfer film 46. The transport roller 49 is coupled to a drive motor, and can make the transfer film 46 run at a constant speed. As the transfer film 46 runs, a sensor Se detects the markers formed on the transfer film 46 at prescribed intervals. The transport roller 49 is configured to rotate an ink ribbon 41 and the transfer film 46 at the same speed in the counterclockwise direction specified in FIG. 1, in the process of forming an image on the transfer film 46.

The ink ribbon 41 is stored in a ribbon cassette 42. In the ribbon cassette 42, a feed spool 43 and a take-up spool 44, which constitute an ink ribbon feeding unit, are incorporated in rotatable state. The take-up spool 44 is coupled to a wind motor Mr1. The film-like ink ribbon 41 is wrapped around, and extends between, the spools 43 and 44. The ink ribbon 41 is a sublime type ribbon composed of three bands having cyan, magenta and yellow ink panels, respectively. Each ink panel has a width that corresponds to the print width of the transfer film 46. The sensor Se detects the position of the ink ribbon 41 being transported as the take-up spool 44 is driven.

The ribbon cassette 42 is held in the housing 2 and can be removed therefrom in a direction perpendicular to the plane of FIG. 1. The ink ribbon 41 is inserted in the gap between an image forming platen (i.e., platen roller) 45 arranged on the housing 2 side and the thermal head 40.

The transfer film 46 is fed from the feed spool 47 and transported to the image-transfer start position as the transport roller 49 rotates in the clockwise direction. At the same time, the ink ribbon 41 is transported to the image-transfer start position as the take-up spool 44 rotates in the anti-clockwise direction. At this point of operation, the transfer film 46 and the ink ribbon 41 are transported in the opposite directions.

When the transfer film 46 and the ink ribbon 41 are aligned at the image-transfer start position, the image forming platen 45 is driven by a pushing mechanism (not shown) toward the thermal head 40, and contacts the thermal head 40 with the transfer film 46 and ink ribbon 41 clamped between it and the thermal head 40.

A head control IC (not shown) is connected to the thermal head 40 and controls the heating of the thermal head 40. As will be specified later, the head control IC controls the heating of the thermal head 40 in accordance with the dither pattern generated for the color image processing device of the present invention.

In synchronism with the heating of the thermal head 40, the take-up spool 44 is driven, moving the ink ribbon 41 at a preset speed in the take-up direction. At this point, the transport roller 49 rotates in the anticlockwise direction. The transfer film 46 can therefore be transported by a distance equivalent to the print width of one card, in the same direction the ink ribbon 41 is transported. An image is thereby formed on this part.

When the image is transferred by using one ink panel, the transport roller 49 rotates again in the clockwise direction, pulling the transfer film 46 back to the image-transfer start position by a distance corresponding to the print width of the card. At this point, the next ink panel is aligned with the transfer film 46 at the image-transfer start position since the ink ribbon 41 is continuously fed in the take-up direction.

As this control of the image-transfer start position proceeds, the cyan, magenta and yellow ink panels are aligned, one after another, at the image-transfer start position of the transfer film 46. After the control of the image-transfer start position, the thermal head 40 and the image forming platen 45 repeat the thermal transfer, transferring image such as a portrait or character data to the transfer film 46, ultimately to print the image on the front or back of a card. The transfer film 46 on which the image is so printed by the thermal transfer printer 5 is transported to the secondary transfer unit of the image forming unit B, in which the printed image is transferred to the surface of a card.

The color image processing device according to this invention, which is incorporated in the thermal transfer printer 5, will be described.

Figure 2:
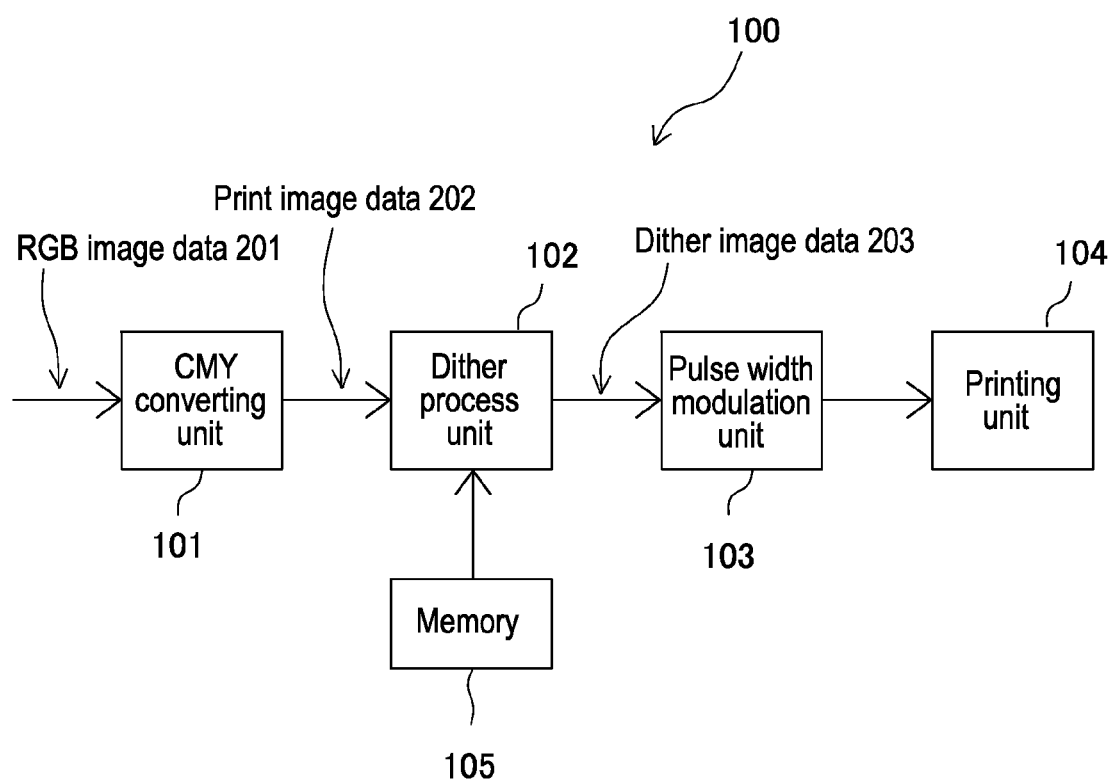
FIG. 2 is a block diagram explaining an embodiment of a color image processing device according to this invention.
Figure 3A:
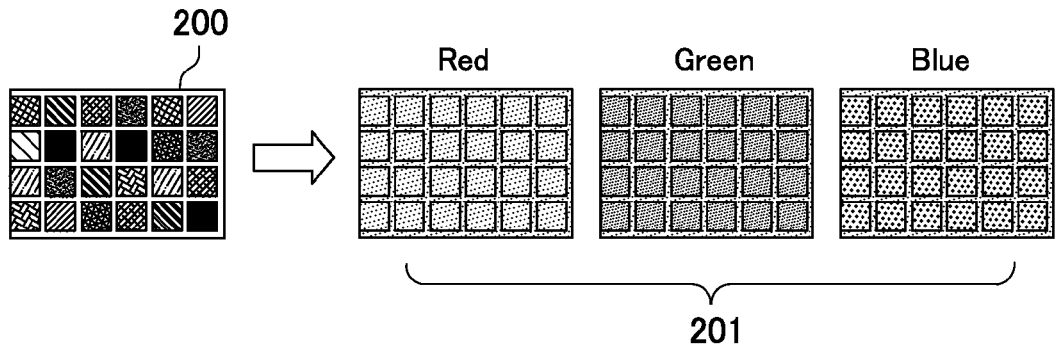
FIGS. 3A to 3C are diagrams schematically explaining how an image is processed in the color image forming device according to this invention.

FIG. 2 is a block diagram showing the configuration of the color image processing device 100 according to this invention, which is incorporated in the thermal transfer printer 5. The color image processing device 100 receives full-color input image data 200 (see FIG. 3A), together with a print instruction, from a higher device such as an external host computer. The color image processing device 100 then decomposes the input image data 200 and converts the same to RGB image data 201. FIG. 3A is a schematic representation of the image displayed on the basis of the input image data 200 and RGB image data 201.

Figure 3B:
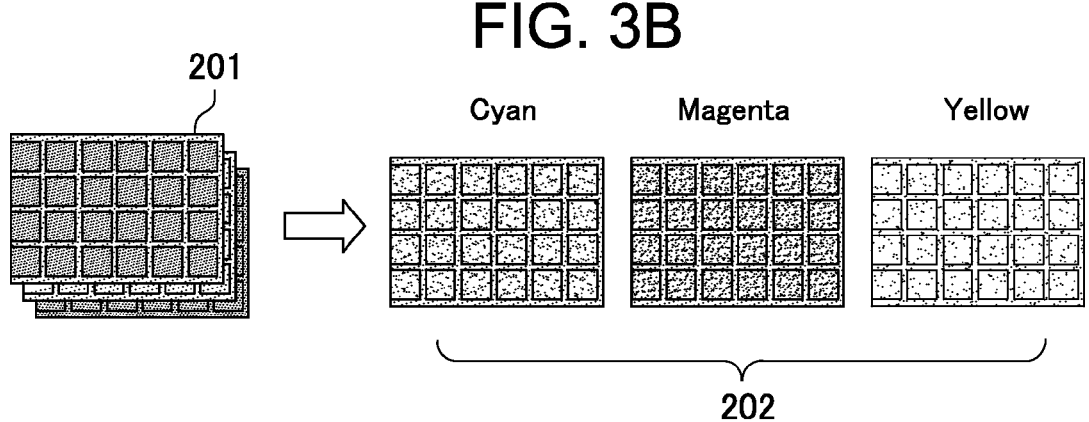
Figure 3C:
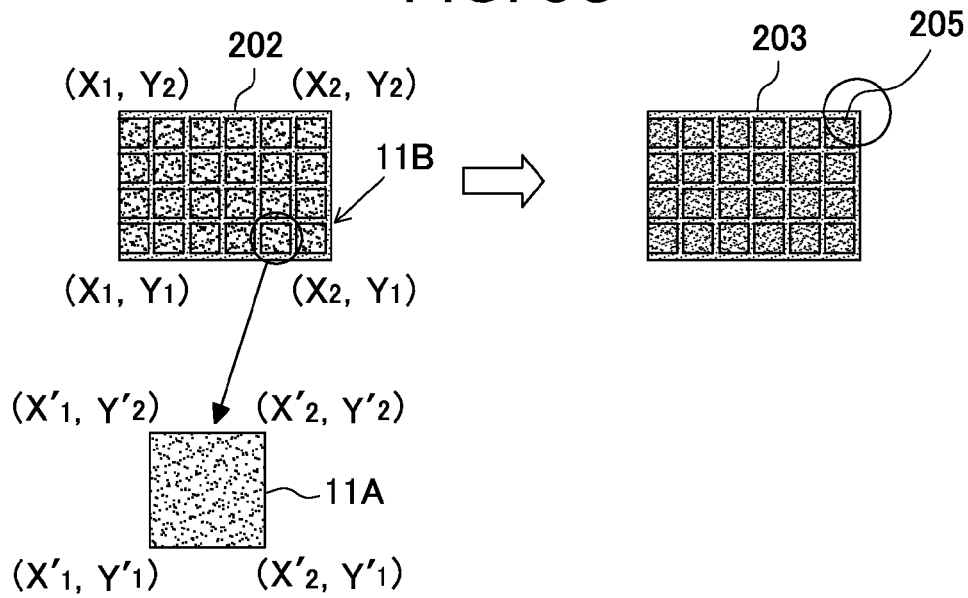

The CMY converting unit 101 performs a color matching process on the RGB image data 201 input. The RGB image data is thereby converted to 256-gradation print image data 202 for each of the three colors, i.e., cyan, magenta and yellow. In this case, the cyan, magenta and yellow image data represent such images as schematically shown in FIG. 3B. Any data region in which color components exist in the printing region, for example region 11A shown in FIG. 6, can thereby be extracted. Then, the dither processing unit 102 (i.e., dither processing portion) generates dither image data 203 from the print image data 202 by performing halftone processing to each print image data 202 for cyan, magenta and yellow. FIG. 3C is a schematic representation of the image displayed on the basis of the cyan print image data 202.

This halftone process is performed by the dither conversion well known in the art. That is, the dither processing unit 102 compares the cyan, magenta and yellow print image data 202 with the dither threshold values stored in a memory 105 and performs dither conversion on the image data, thereby determining a dither pattern. The dither threshold values used in this case are set, each for 3×3 dots of one pixel. The gradation of each dot is matched with the 256 gradations for the print image data 202. The dither processing unit 102 generates dither image data 203 from the dither patterns determined for cyan, magenta and yellow.

Figure 5:
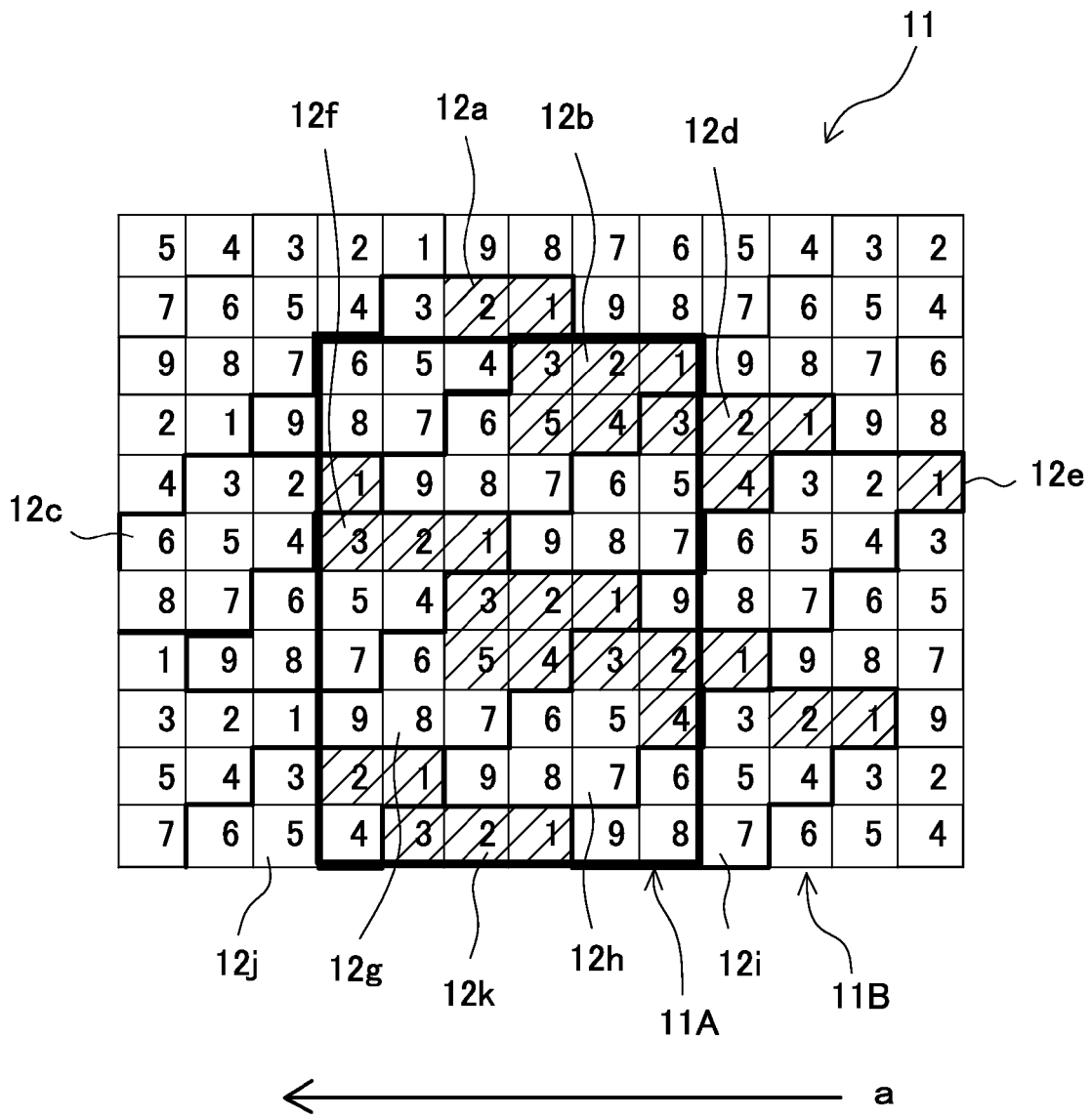
FIG. 5 is a diagram schematically showing a dither pattern.

FIG. 5 shows the cyan dither pattern 11 the dither processing unit 102 has generated. In this pattern, 3×3 dots constitute one block, which is associated with one pixel of the print image data 202. Based on the comparison of the image data with the dither threshold values, the dither processing unit 102 writes the print data to the number of dots that accord with the gradations for the pixels of the print image associated with the block. A dither pattern 11 is thereby generated. In this case, the numbers affixed to the respective dots indicate the order (growth sequence) in which the dots are grown in the sub-scanning direction of the thermal head 40, or in the direction of the arrow a. Any dot represented by the print data is printed by the thermal head 4.

In the dither pattern 11, three dot rows, each composed of three dots arranged in the order they have been grown, are arranged one above another. The first dot of each row is set off from the first dot of either the upper or lower row, forming a step pattern.

In the dither pattern 11 so constituted that the dots are arranged in a step pattern, any two adjacent blocks 12 grow such that the third dot of the first block is continuous to the first dot of the second block 12. Hence, the ink is rarely isolated even in a low-gradation, the transfer efficiency is hardly influenced by external influence such as exfoliation and temperature, even in the low-gradation printing.

FIG. 3C shows the image represented by the dither image data 203 generated by performing the dither conversion on the cyan print image data 202. In this case, the dither processing unit 102 also generates dither image data 203 by using the magenta and yellow dither patterns.

After the dither image data 203 based on the cyan, magenta and yellow dither patterns so made has been output, the pulse-width modulating unit 103 controls the time of supplying electric power to the thermal head 40 of the printing unit 104. The amount in which to transfer the ink is thereby adjusted, whereby a halftone color image is printed. The printing unit 104 is not limited to a thermal transfer printer. Rather, it may be a printing engine of either the electronic photographing type or the ink-jet printing type.

Figure 4A:
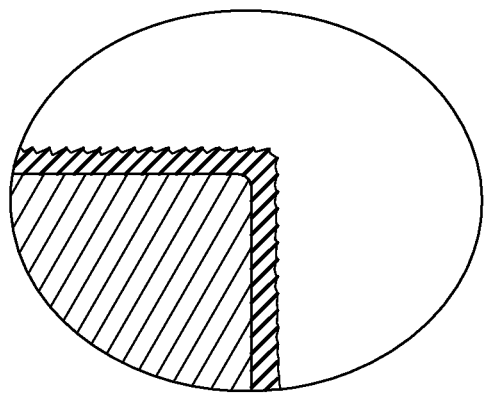
FIGS. 4A and 4B are diagrams explaining the jaggy parts at the edge of an image.

When the printing unit 104 prints the dither image data 203 generated by converting the print image data 202 on the transfer film 46, jaggy parts are generated at the edges of the image halftone-processed by means of the dither conversion. FIG. 4A shows a jaggy part, which has been generated at an edge 205 of the image shown in FIG. 3C.

This part 205 of the image is printed as the printing unit 104 controls the supply of electric power to the heating elements that correspond to the dots of the 11 blocks 12a to 12k included in the data region 11A of the dither pattern shown in FIG. 5. That is, the printing unit 104 supplies power to the dots at which the print data of an image is written, thereby printing the image. The data region 11A is a region in which the color components exist, for example the square region shown in FIG. 3C. The frame surrounding the square region is a region in which no color components exist.

Hence, when the dither pattern 11 is generated by such dither conversion, some dots at which the print data has been written are isolated from the data region 11A in the blocks 12a, 12d, 12e and 12i among the eleven bocks. The data region 11A exists in the print region $(x_1, y_1)$, $(x_2, y_1)$, $(x_1, y_2)$, $(x_2, y_2)$ for the entire cyan image shown in FIG. 3 (c).

However, some dots of the blocks 12a, 12d, 12e and 12i are outside the data 11A region $(x'_1, y'_1)$, $(x'_2, y'_1)$, $(x'_1, y'_2)$, $(x'_2, y'_2)$. Hence, the dots exiting in the region 11B and having no color components are printed, too, inevitably generating jaggy parts at any edge of the print image.

In this invention, it is therefore determined whether one or more of the dots constituting each pixel in the print region $(x_1, y_1)$, $(x_2, y_1)$, $(x_1, y_2)$, $(x_2, y_2)$ of the image exist in the region 11B outside the data region in which one or more dots constituting pixels exist. If one or more dots of the data region 11A exist in the region 11B shown in FIG. 6, these dots are moved into the data region 11A, thereby preventing generation of jaggy parts.

In one method of moving the dots, to the block 12 wherein one or more dots exist outside the data region 11A (i.e., $(x'_1, y'_1)$, $(x'_2, y'_1)$, $(x'_1, y'_2)$, $(x'_2, y'_2)$, the print data items are sequentially moved from the dots existing outside the data region and holding the print data, in the order these dots are arranged, to the dots existing in that data region and holding no print data, in the order these dots are arranged.

At this point, it is detected whether one or more dots on which print data is written, constituting any block 12 existing in the print region $(x_1, y_1)$, $(x_2, y_1)$, $(x_1, y_2)$ and $(x_2, y_2)$ has come from the data region 11A $(x'_1, y'_1)$, $(x'_2, y'_1)$, $(x'_1, y'_2)$, $(x'_2, y'_2)$ in which color components exist. The dots outside the data region are then rearranged in the data region, thereby reducing the jaggy parts.

The dither processing unit 102 will be described more specifically, with reference to the data region 11A. The dither processing unit 102 rearranges the dots, thereby generating a corrected dither pattern. That is, in the blocks 12a, 12d, 12e and 12i, the print data items written in the dots in the region $(x'_1, y'_1)$, $(x'_2, y'_1)$, $(x'_1, y'_2)$, $(x'_2, y'_2)$ are sequentially moved, in the growth sequence, to the dots existing in the data region 11A and holding no print data in the growth sequence, thus rearranging the dots. A corrected dither pattern is thereby generated.

Figure 6:
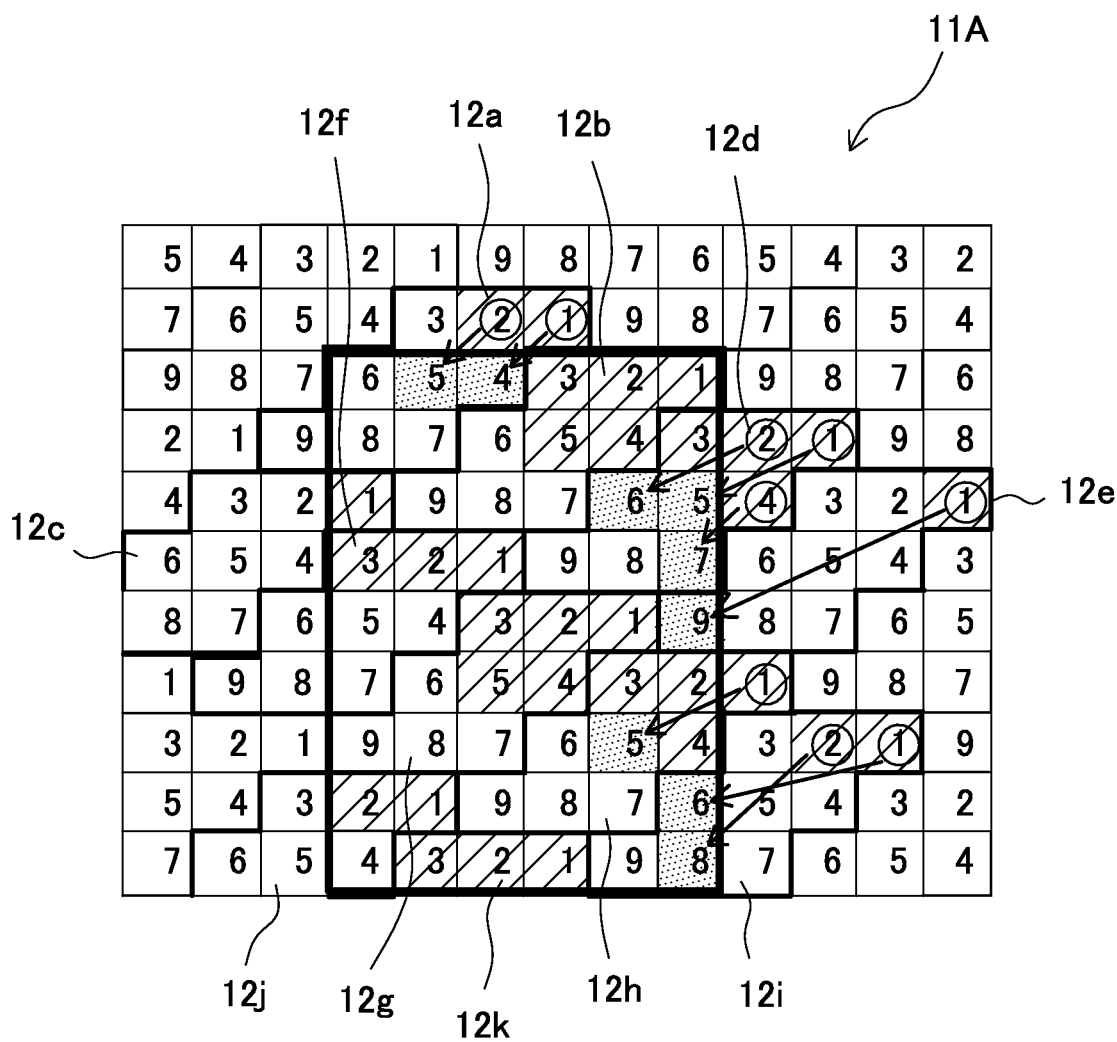
FIG. 6 is a diagram schematically showing the dither pattern of FIG. 5, which has been corrected by re-arranging the dots constituting the dither pattern of FIG. 5.

As a result, in the block 12a shown in FIG. 6, the print data written at the dot 1 (hereinafter, the number indicates the growth sequence) is moved to the block 4, and the print data written at the dot 2 is moved to the block 5.

Similarly, in the block 12d, the print data written at the dot 1 is moved to the block 5, the print data written at the dot 2 is moved to the block 6, and the print data written at the dot 4 is moved to the block 7. In the block 12e, the print data written at the dot 1 is moved to the block 9. In the block 12i, the print data written at the dot 1 is moved to the block 6, and the print data written at the dot 2 is moved to the block 8.

Figure 4B:
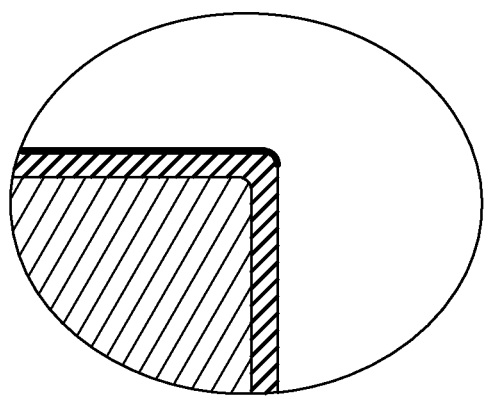

Thus, the process of rearranging the print data is performed after the dither conversion. The dither pattern corrected for the data region 11A of FIG. 6 is thereby generated. The printing unit 104 uses the dither image data 203 of the dither pattern so corrected, printing a cyan image. As shown in FIG. 4B, the cyan image has but fewer jaggy parts than before.

Thus, in this invention, whether one or more of dots comprising the each pixel is outside the data region in which each color component of the image exists is detected in a step, relative to each pixel existing in the print region $(x_1, y_1)$, $(x_2, y_1)$, $(x_1, y_2)$, $(x_2, y_2)$. Hence, the blocks representing the image edges need not be identified. The process flow can therefore be simplified. Therefore, the process time for reducing jaggy parts is short. Further, the memory capacity required for the calculation process can be small.

Different dither patterns are generated for the color components magenta and yellow, respectively, but are changed to corrected dither patterns. Therefore, fewer jaggy parts than otherwise exist near the edges of the color image formed by printing cyan, magenta and yellow images, one on another. This enhances the printing quality of the thermal transfer printer.

As described above, in the color image processing device according to this invention, a block 12 in which one or some dots holding print data are outside the data region is detected from the blocks 12 constituting a data region corresponding to the image part of a dither pattern 11, thereby enabling the printing unit 104 to print a certain part of an image. Further, any dots outside the data region are rearranged in the data region. Hence, the number of jaggy parts at the edges of the image can be reduced by a simple process, without performing complicated calculations such as the calculation of gravity center and the extraction of edge information.

INDUSTRIAL APPLICABILITY

This invention relates to a high-quality color image processing device that generates but a few jaggy parts at the edges of any color image formed on a recording medium. The invention therefore possesses industrial applicability.

EXPLANATION OF REFERENCE SYMBOLS

11 Dither pattern for cyan
12 Block
102 Dither processing unit (dither processing unit)

The invention claimed is:

1. A color image processing device for outputting a dither image data for a printing unit to form an image by using dither patterns of blocks each being composed of a plurality of dots representing gradations of each pixel of the image in a prescribed print region,
wherein the dots constituting one block are arranged in a growth sequence in an ascending order of gradation, and a print data of the image is written sequentially at the dots, the number of which corresponds to the gradation of the pixels associated with the block;
an extracting unit is provided to extract a data region holding color components, from the print data of the image;
a dither processing unit is provided to generate the dither image data formed by using the dither patterns for the color components extracted by the extracting unit;
an output unit is provided to output the dither image data to the printing unit; and
the dither processing unit detects whether one or more of the dots constituting each of the pixels constituting the image are outside the data region, and moves any dot outside the data region to a certain dot constituting same pixel and existing in the data region.

2. The color image processing device according to claim 1, wherein in the block having one or more dots outside the data region, the print data written at the dots which exist outside the data region, hold the print data and have higher arrangement order are sequentially moved to the dots which exist in the data region, hold no print data and have higher arrangement order.

3. The color image processing device according to claim 1, wherein the number of dots constituting a block is a multiple of 3 in the dither pattern.

4. The color image processing device according to claim 3, wherein the number of dots is 9.

5. The color image processing device according to claim 4, wherein the dots are divided, in the growth sequence, into three rows, and a first grown dot of each row is set off from the first grown dot of immediately upper or lower row, thereby forming a step pattern.

6. The color image processing device according to claim 1, wherein the dither patterns are generated for at least cyan, magenta and yellow, respectively.

* * * * *